United States Patent
Mahadevappa et al.

(10) Patent No.: US 12,321,641 B2
(45) Date of Patent: Jun. 3, 2025

(54) USING A STORAGE INTERFACE PROTOCOL TO PASS PARAMETERS USED TO PROCESS DATA

(71) Applicant: Western Digital Technologies, Inc., San Jose, CA (US)

(72) Inventors: Harshitha Begur Mahadevappa, Bangalore (IN); Kumar Ranjan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/355,078

(22) Filed: Jul. 19, 2023

(65) Prior Publication Data

US 2024/0231692 A1     Jul. 11, 2024

Related U.S. Application Data

(60) Provisional application No. 63/479,213, filed on Jan. 10, 2023.

(51) Int. Cl.
G06F 3/06     (2006.01)

(52) U.S. Cl.
CPC ............ *G06F 3/0659* (2013.01); *G06F 3/061* (2013.01); *G06F 3/0679* (2013.01)

(58) Field of Classification Search
CPC ....... G06F 3/0659; G06F 3/061; G06F 3/0679
See application file for complete search history.

(56) References Cited

U.S. PATENT DOCUMENTS

| | | | |
|---|---|---|---|
| 8,086,781 B2 | 12/2011 | Ananny | |
| 10,228,878 B1* | 3/2019 | Mateescu | G06F 3/0679 |
| 10,691,417 B2 | 6/2020 | Souri | |
| 11,064,194 B2 | 7/2021 | Muthiah | |
| 2012/0243601 A1* | 9/2012 | Schmit | H04N 19/61 |
| | | | 375/E7.198 |
| 2019/0042093 A1* | 2/2019 | Adams | G06F 3/0655 |
| 2021/0049120 A1* | 2/2021 | Cha | G06F 3/0688 |
| 2021/0182219 A1* | 6/2021 | Benisty | G06F 3/0604 |
| 2023/0266917 A1* | 8/2023 | Choe | G06F 3/0604 |

FOREIGN PATENT DOCUMENTS

WO     2022005540 A1     1/2022

* cited by examiner

*Primary Examiner* — Chie Yew
(74) *Attorney, Agent, or Firm* — Patent Law Works LLP

(57) ABSTRACT

Systems and methods for application tunneling using a storage interface protocol for an application processor are disclosed. A host interface using the storage interface protocol may connect to a host system, receive a host storage command, and determine from the host storage command a set of application-specific executable parameters and target host data. The host interface may pass the application-specific executable parameters to an application processor circuit for processing the target host data and returning the resulting processed host data. An example configuration includes a data storage device using its NVMe controller to receive commands for an onboard data processing circuit, such as video transcoding FPGA.

20 Claims, 7 Drawing Sheets

USING A STORAGE INTERFACE PROTOCOL TO PASS PARAMETERS USED TO PROCESS DATA

TECHNICAL FIELD

The present disclosure generally relates to offloading application processing in storage systems and, more particularly, to using storage protocols to support tunneling for data processing applications.

BACKGROUND

Some computing systems, such as storage arrays, may include multiple data storage devices supporting one or more host systems through a peripheral or storage interface bus, such as peripheral component interconnect express (PCIe), serial advanced technology attachment (SATA), serial attached [small computer serial interface (SCSI)] (SAS), or Fibre Channel (FC). In some configurations, these storage systems may use a storage protocol, such as non-volatile memory express (NVMe) to provide efficient access to the storage resources of connected data storage devices, such as drives (solid-state drives, hard disk drives, hybrid drives, tape drives, etc.). Storage protocols, such as NVMe, may support various network and storage interface protocols, such as NVMe-over-fabric (NVMeoF), NVMe-over-transmission control protocol (TCP), NVMe-over-FC (NVMeoFC), etc. NVMe is a communication driver used by operating systems to communicate data with data storage devices based on command queues configured to efficiently handle storage commands, such as read, write, and delete commands, as well as extended command sets for storage device administration and, in some configurations, data processing. Due to the efficiency of NVMe for storage access, NVMe may be a preferred storage communication protocol for host communication to data storage devices.

Increasingly data and processing intensive applications, such as distribution of video content, machine learning training, etc., may benefit from processing closer to the storage devices in which the target data is stored. For example, stored video data may be served in a wide variety of video formats and sizes, requiring video transcoding from a stored or received video data format to one or more other video data formats. Video transcoding may benefit from specialized processing hardware and/or software and many current video transcoding methodologies are based on software, graphics processing unit (GPU) accelerators, field programmable gate array (FPGA) accelerators, and/or application specific integrated circuit (ASIC) encoders. Video transcoding hardware, such as GPU accelerators, FPGA accelerators, and ASIC encoders may rely on different data bus interface protocols and communication protocols for interfacing with a host operating system. Video transcoding, like other processing intensive applications, require low latencies and high speed to meet on-demand and real-time distribution (particularly for live events).

An architecture for integrating and accessing specialized processing hardware into data storage systems using storage communication protocols may be needed.

SUMMARY

Various aspects for application tunneling through storage communication protocols, particularly use of storage command registers for passing block transactions to processing hardware, are described.

One general aspect includes a system that includes a processor, a memory, and a host interface configured to: connect, using a storage interface protocol, to at least one host system; receive, using the storage interface protocol, a host storage command; and determine, based on the host storage command application-specific executable parameters and target host data. The system also includes an application processor circuit configured to: receive, from the host interface, the application-specific executable parameters; process, using the application-specific executable parameters, the target host data; and return, to the at least one host system, processed host data.

Implementations may include one or more of the following features. The system may include a data storage device that include: a non-volatile storage medium configured to store host data; the processor; the memory; the host interface; and the application processor circuit. The application processor circuit may be further configured to store, prior to returning the processed host data, the processed host data in at least one of: the memory; or the non-volatile storage medium. The host storage command may be formatted as a write command that includes: a set of command parameters including the application-specific executable parameters; an application indicator configured to initiate passing execution of the host storage command to the application processor circuit; and a buffer address for the target host data. The host interface may be further configured to indicate completion of the host storage command to the at least one host system, and the data storage device may be configured to not retain the target host data in the non-volatile storage medium after completion of the host storage command. The host interface may be further configured to: receive a notification of the host storage command; access, using direct memory access, the host storage command from a storage command queue in a host memory buffer in the at least one host system; and determine, from the host storage command, buffer location in the host memory buffer for accessing the target host data. The application processor circuit may be further configured to: receive a buffer location for the target host data in a host memory buffer in the at least one host system; and access, using direct memory access, the target host data in the host memory buffer for processing the target host data. The application processor circuit may be further configured to store, using direct memory access, the processed host data to a buffer location in a host memory buffer on the at least one host system to return the processed host data. The at least one host system may be configured to: determine a data processing operation for an application, where the data processing operation is configured with a transaction format; convert the data processing operation to a plurality of block transactions, where the host storage command corresponds to a selected block transaction of the plurality of block transactions; and send the host storage command to the host interface for processing. The application may be configured as a video transcoding application; the data processing operation may be configured as a codec transaction; and the application processor circuit may be further configured to decode the target host data, scale the decoded host data, and encode the scaled host data to generate the processed host data. The application processor circuit may be configured as a field programmable gate array transcoder circuit.

Another general aspect includes a computer-implemented method that includes: connecting, using a storage interface protocol, to at least one host system; receiving, using the storage interface protocol, a host storage command; determining, based on the host storage command, application-specific executable parameters and target host data; receiving, by an application processor circuit, the application-specific executable parameters; processing, by the application processor circuit and using the application-specific executable parameters, the target host data; and returning, by the application processor circuit and to the at least one host system, processed host data.

Implementations may include one or more of the following features. The computer-implemented method where a data storage device is configured to execute: connecting to the at least one host system; receiving the host storage command; and determining the application-specific executable parameters and the target host data. The computer-implemented method may include storing, by the application processor circuit and prior to returning the processed host data, the processed host data in at least one of: a memory of the data storage device; or a non-volatile storage medium of the data storage device. The computer-implemented method may include indicating, by the data storage device, completion of the host storage command to the at least one host system, where the host storage command is formatted as a write command that includes: a set of command parameters including the application-specific executable parameters; an application indicator configured to initiate passing execution of the host storage command to the application processor circuit; and a buffer address for the target host data. The data storage device may be configured to not retain the target host data in a non-volatile storage medium of the data storage device after completion of the host storage command. The computer-implemented method may include: receiving a notification of the host storage command; accessing, using direct memory access, the host storage command from a storage command queue in a host memory buffer in the at least one host system; and determining, from the host storage command, buffer location in the host memory buffer for accessing the target host data. The computer-implemented method may include: receiving, by the application processor circuit, a buffer location for the target host data in a host memory buffer in the at least one host system; and accessing, by the application processor circuit and using direct memory access, the target host data in the host memory buffer for processing the target host data. The computer-implemented method may include storing, by the application processor circuit and using direct memory access, the processed host data to a buffer location in a host memory buffer on the at least one host system to return the processed host data. The computer-implemented method may include: determining, by the at least one host system, a data processing operation for an application, where the data processing operation is configured with a transaction format; converting, by the at least one host system, the data processing operation to a plurality of block transactions, where the host storage command corresponds to a selected block transaction of the plurality of block transactions; and sending, by the at least one host system, the host storage command for processing by the application processor circuit. The computer-implemented method may include: decoding, by the application processor circuit, the target host data; scaling, by the application processor circuit, the decoded host data; and encoding, by the application processor circuit, the scaled host data to generate the processed host data, where the application is configured as a video transcoding application and the data processing operation is configured as a codec transaction.

Still another general aspect includes a data storage device that includes: a processor; a memory; a non-volatile storage medium; means for connecting, using a storage interface protocol, to at least one host system; means for receiving, using the storage interface protocol, a host storage command; and means for determining, based on the host storage command, application-specific executable parameters and target host data. The data storage device also includes an application processor circuit that includes: means for receiving, by an application processor circuit, the application-specific executable parameters; means for processing, by the application processor circuit and using the application-specific executable parameters, the target host data; and means for returning, by the application processor circuit and to the at least one host system, processed host data.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve the offloading of application-level processing in a data storage system, such as by using storage command registers for passing block transactions to processing hardware. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
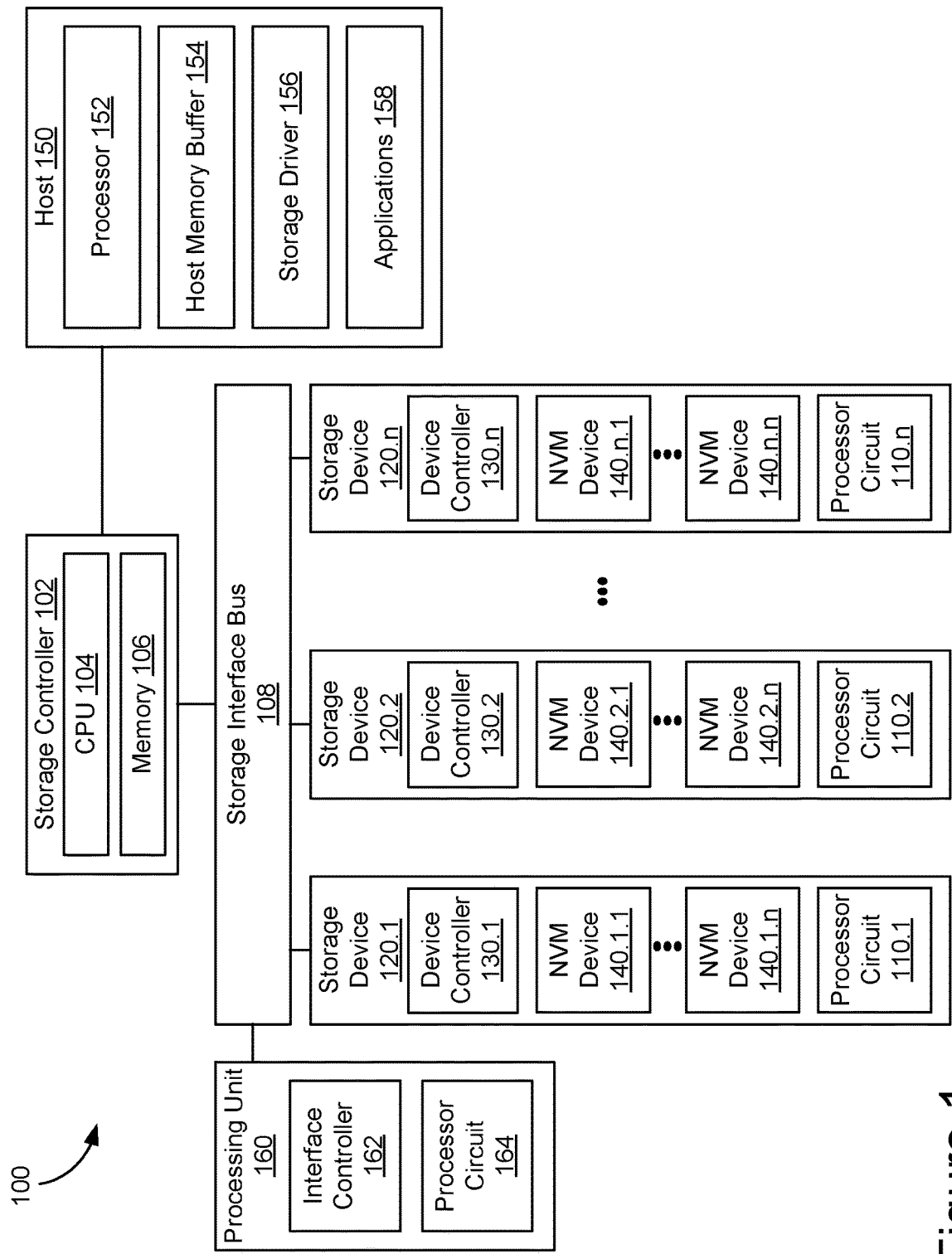
FIG. 1 schematically illustrates a multi-device storage system configured with application processor circuits.

FIG. 1 shows an embodiment of an example data storage system 100 with data storage devices 120 interconnected by a storage interface bus 108. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server, storage array blade, or similar storage unit for use in data center storage racks or chassis. Storage devices 120 may interface with one or more storage controllers 102 and provide data storage and retrieval capabilities for or through storage controller 102 to support one or more hosts 150 (also referred to as host systems or host nodes). In some embodiments, storage devices 120 may be configured in a storage hierarchy that includes storage nodes, storage controllers (e.g., storage controller 102), and/or other intermediate components between storage devices 120 and hosts 150. For example, each storage controller 102 may be responsible for a corresponding set of storage nodes and their respective storage devices 120 connected through a corresponding backplane network.

In the example shown, storage devices 120 may include processor circuits 110 in addition to the processors used by device controller 130 and NVM devices 140 for executing data storage operations. For example, processor circuits 110 may be configured as application-specific processor circuits that more efficiently carry out defined data processing operations to support applications 158 to extract, transform, or otherwise process host data received by or stored in storage devices 120. In some embodiments, processor circuits 110 may include field programmable gate arrays (FPGAs), application-specific integrated circuits (ASICs), graphics processor units (GPUs), or other specialty circuits configured for a specific data processing function beyond data storage or retrieval. For example, processor circuits 110 may include FPGA video transcoders, machine learning training GPUs, or specialized data processing ASICs. As further described below, device controllers 130 may be configured to provide the storage communication protocol interface to enable application tunneling for host applications 158 to access and use the data processing capabilities of processor circuits 110.

In the embodiment shown, a number of storage devices 120 are attached to a common storage interface bus 108 for host communication. For example, storage devices 120 may include a number of drives arranged in a storage array, such as storage devices sharing a common rack, unit, or blade in a data center or the solid state drives (SSDs) in an all flash array. In some embodiments, storage devices 120 may share a backplane network, network switch(es), and/or other hardware and software components accessed through storage interface bus 108. For example, storage devices 120 may connect to storage interface bus 108 through a plurality of physical port connections that define physical, transport, and other logical channels for establishing communication with the different components and subcomponents for establishing a communication channel to storage controller 102 and/or host 150. In some embodiments, storage interface bus 108 may provide the primary host interface for storage device management and host data transfer. In some configurations, storage devices 120 may include other interfaces (not shown), such as a control bus interface used for low-bandwidth communications related to storage device power states, configuration, and management, such as control bus connections to a baseboard management controller (BMC), In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Device controllers 130 may include host interface functions, including one or more controllers for storage protocols to communicate over storage interface bus 108. For example, device controllers 130 may include peripheral component interconnect express (PCIe) interfaces and non-volatile memory express (NVMe) controllers for managing communication with storage controller 102 and/or host 150 via storage interface bus 108. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 and/or hosts or host systems 150 may be coupled to data storage system 100 through a network interface that is part of host fabric network that includes storage interface bus 108 as a host fabric interface. In some embodiments, multiple host systems 150 are coupled to data storage system 100 through the fabric network, which may include a storage network interface of storage controller 102 or other interface capable of supporting communications with multiple host systems 150. Storage devices 120, storage controller 102, and/or host 150 may be configured to use NVMe-over-fabric (NVMeoF) or similar protocols for supporting NVMe storage communication protocols over the intervening network components. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host systems 150, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 150 are sometimes called a host, client, or client system. In some embodiments, host system 150 is a server system, such as a server system in a data center, or a storage system, such as a storage array in a data center. In some embodiments, the one or more host systems 150 are one or more host devices distinct from storage controller 102 or a storage node housing the plurality of storage devices 120. The one or more host systems 150 may be configured to store and access data in the plurality of storage devices 120 and may each be individually mapped to one or more storage devices 120 based on a virtual machine architecture. In some configurations, a group of hosts 150 may be configured in a host complex supported by one or more host administration modules or systems. Host administration systems may assist in allocating hosts 150 to storage devices 120 through storage controller 102, such as based on one or more NVMe protocols.

In some embodiments, host 150 may include on or more host processors 152 for executing compute operations or instructions for on or more applications 158 using host data stored in storage devices 120. Host 150 may be configured with a host memory buffer 154, such as dynamic random access memory (DRAM), allocated for use by storage devices 120 according to NVMe protocols. For example, host 150 may allocate a set of storage locations in host memory buffer 154 to each storage device 120 (or corresponding namespaces and connections) for maintaining command queues and buffering and exchanging host data. Storage devices 120 may be configured with direct memory access (DMA) to host memory buffer 154. Host 150 may include a storage driver 156 configured to support storage communication protocols, such as NVMe, for communication with storage devices 120 and/or storage controller 102. Applications 158 may include software programs supporting host and/or client computer applications, such as data processing, video serving and/or transcoding, machine learning, games, communication and productivity applications, etc. In some embodiments, one or more applications 158 may include data processing intensive tasks that benefit from acceleration through application-specific processor circuits, such as processor circuits 110 and/or 164.

Storage controller 102 may include one or more central processing units (CPUs) 104 (or controller processors) for executing compute operations or instructions for accessing storage devices 120 through storage interface bus 108. In some embodiments, CPU 104 may include a processor and be associated with operating controller memory 106 for executing both storage operations and a storage interface protocol compatible with storage interface bus 108 and storage devices 120. In some embodiments, a separate storage interface unit (not shown) may provide the storage interface protocol and related processor and memory resources. From the perspective of storage devices 120, storage interface bus 108 may be referred to as a host interface bus and provides a host data path between storage devices 120, storage controller 102, and/or hosts 150.

In some embodiments, an application processing unit 160 may be configured for access using storage interface bus 108 and corresponding storage bus and storage communication protocols. For example, application processing unit 160 may include an interface controller 162 configured to support NVMe storage communication protocols and register as an NVMe device with host 150. Processor circuit 164 may be configured similarly to processor circuits 110 in storage devices 120 and enable host applications 158 to use the application-specific data processing capabilities of processor circuit 164 by sending executable commands inside storage commands to operate on host data in host memory buffer 154. Processing unit 160 may not include non-volatile memory for storing host data on an extended basis and may not otherwise operate as a data storage device. It may include memory for storing host data during data processing transactions, such as a buffer memory for receiving host data from the host memory buffer through DMA, processing it through processor circuit 164, buffering the processed data back to the buffer memory, and then using DMA to return the processed host data back to the host memory buffer.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
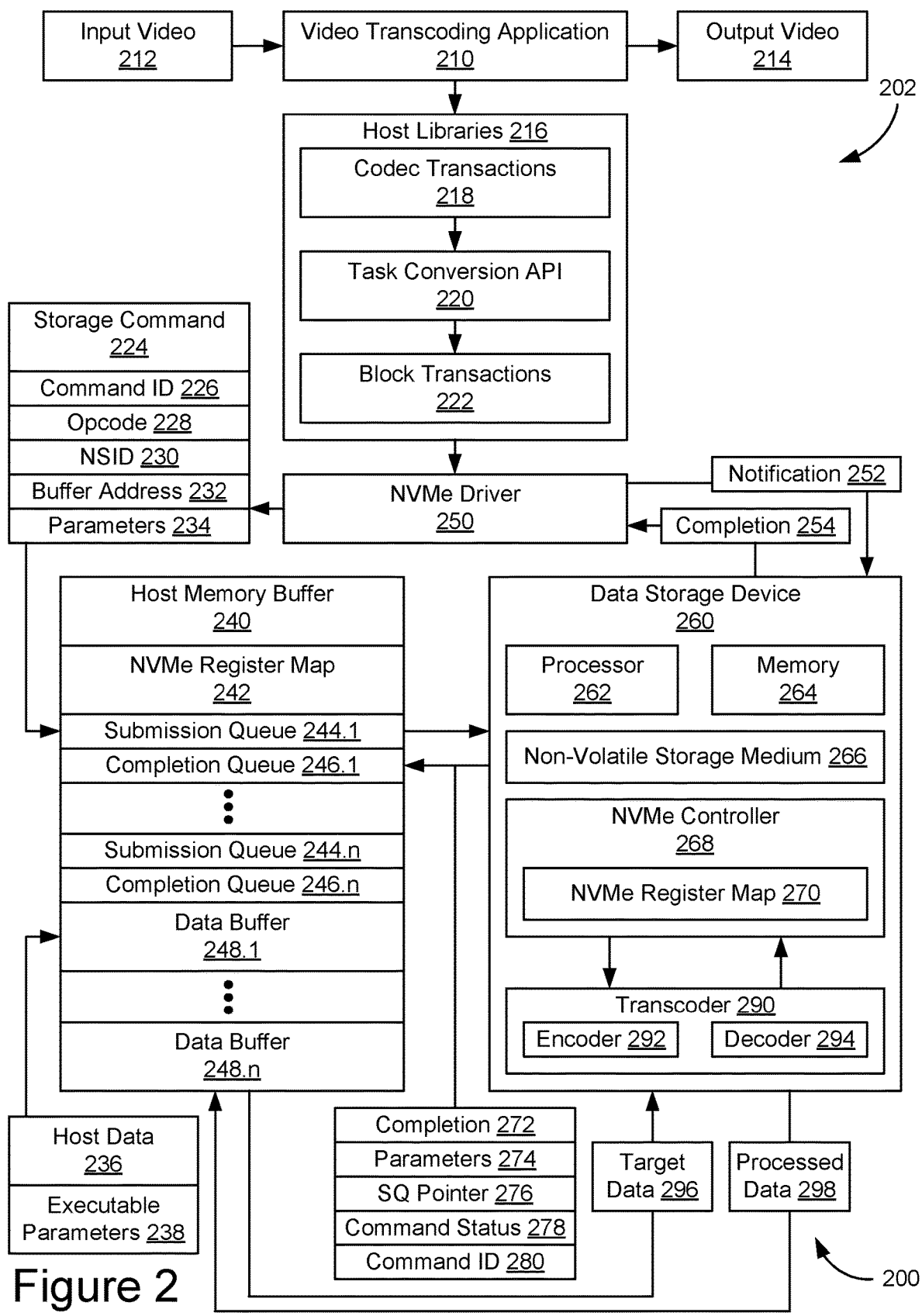
FIG. 2 schematically illustrates an example application tunneling architecture using NVMe storage interface protocols that may be used by the multi-device storage system of FIG. 1.

FIG. 2 shows an example application tunneling architecture 200 using NVMe storage interface protocols that may be used by a storage system, such as data storage system 100 in FIG. 1. More specifically, a host system 202, such as host 150, may be configured with video transcoding application 210 that uses host libraries 216, host memory buffer 240, and NVMe driver 250 to send application executables to data storage device 260 in NVMe storage commands for execution by transcoder 290. The example application shown is video transcoding application 210, but a similar architecture may support a variety of applications and corresponding application-specific processors. The NVMe interface between host system 202 and data storage device 260 may be configured to enable block transactions for transcoder 290 to be tunneled through NVMe storage commands, such as write commands.

The example host application is video transcoding application 210, executing using processor and memory resources of host system 202 to provide video transcoding for a user. For example, video transcoding application 210 may be configured to receive input video data 212, determine its current video format (encoding, aspect ratio, sample rate, pixel count, etc.) and a different target video format, transcode the video data from the current video format to the target video format, and return output video data 214 having the target video format. Video transcoding application 210 is an example of an application that may benefit from an application-specific circuit, such as a transcoder circuit with dedicated video decoder and encoder functions. In some embodiments, video transcoding application 210 may receive input video data 212 from another storage system, video capture device, and/or data storage device 260 (if previously stored there). Output video data 214 may be output to another storage system, a video display device, a video server, and/or data storage device 260 (to store the video data there in the new format). An example video transcoding application is FFmpeg, an open-source suite of tools and libraries for processing video and audio files.

Once video transcoding application 210 has received a video file for transcoding, it may use host libraries 216 to process the video file. Host libraries 216 may include executable software functions corresponding to different underlaying functions of video transcoding application 210. For example, host libraries 216 may include a codec library corresponding to the different input and output codecs supported by video transcoding application 210. In some embodiments, host libraries 216 may include a set of library executables, such as opensource video codec libraries, for decoding, encoding, and scaling video data. For example, host libraries 216 may include FFmpeg video libraries for various codecs. Host libraries 216 may include one or more libraries for determining codec transactions 218 based on input video data 212 and the target video format. For example, codec transactions 218 may include a transaction format defined by the library interface to pass a file location and set of transaction parameters for executing the requested transcoding function. Once one or more codec transactions for transcoding the video data is determined, task conversion application protocol interface (API) 220 may convert codec transactions 218 to a corresponding number of block transactions 222. For example, each codec transaction 218 may be divided into a plurality of corresponding block transactions 222 compatible with the write data format of the NVMe storage protocol. Block transactions 222 may be configured as system calls that interact with host memory buffer 240 and NVMe driver 250 to communicate target host data and executable parameters to transcoder 290.

For example, a video file or live stream may be received as an input by FFmpeg or a similar video transcoding application, such as converting a .flv video file to an .mpg video file using "$ ffmpeg -i video.flv video.mpg". The application command may determine the action to be taken by video transcoding application 210, such as video format conversion. Video transcoding application 210 then calls the specific library in host libraries 216, such as libavcodec from the FFmpeg libraries, which is an encoding/decoding framework supporting multiple codecs and corresponding decoders and encoders. In this example, codec transaction 218 is to read the input video data 212 (e.g., video.flv), decode it using a .flv decoder, and encode the decoded video data to a target format (.mpg) using an .mpg encoder. These actions would not be valid commands in the NVMe protocol. Task conversion API 220 may be configured to parse the codec transactions and convert them to a series of NVMe commands, such as write commands, with application-specific parameters on the command parameters to initiate processing by transcoder 290 rather than the storage to the NVM of data storage device 260. For example, task conversion API 220 may include a "transform_write( )" function configured to map the command parameters of codec transaction 218 to one or more NVMe write commands and/or NVMe read commands. In some configurations, vendor-specific commands may be used instead of or in addition to standard NVMe commands. Block transactions 222 may include the corresponding series of NVMe commands. For example, the first block transaction may be an NVMe write command that writes input video data 212 to a location in host memory buffer 240 and provides executable parameters (such as the input and output video format parameters) in the host data payload. The second block transaction may be an NVMe read command that reads output video data 214 from a location in host memory buffer 240 after the transcoded video data is stored there by transcoder 290. In some embodiments, the second block transaction may be initiated by a second API function of task conversion API 220, such as a "transform_read( )" function. In some embodiments, block transactions may divide codec transaction 218 into highly efficient input/output (IO) commands optimized for the block size and interface characteristics of the NVMe storage communication protocol. For example, since video data and video transcoding are non-structured IO commands, the LBA structure used by data storage device 260 does not align with the structure of the video data. The LBAs of the data unit in the NVMe write command may not need to map to LBAs in the NVM and may be regarded as a more generalized command payload that includes a combination of host data (e.g., input video data) and executable parameters for the transcoding operation executed by transcoder 290. This may be particularly useful if using standard NVMe commands that do not have command parameters defined for video transcoding purposes (though a vender-specific command could be defined with application-specific command parameters communicated in the command queue data itself). For example, the initial LBAs in the host data written to the data buffer may be repurposed as command header data, such as LBAs 1-10 including configuration data, LBAs 11-25 including metadata information for the transcoding command, and the remaining LBAs including the actual video data for transcoding.

Block transactions 222 may be passed to NVMe driver 250 to generate storage command 224 and host data 236 to be written to host memory buffer 240. In some embodiments, each block transaction 222 may correspond to a storage command written to a submission queue in host memory buffer 240 for processing by data storage device 260. NVMe driver 250 may be configured to receive block transactions 222 configured as data storage system calls compliant with NVMe storage operations and command parameters. For example, block transactions 222 may include command parameters and a data buffer location for the input video data and, in some configurations, executable parameters for transcoder 290, as well as indicating the type of NVMe command, such as read, write, or a vendor-specific variation of those storage commands. In some embodiments, each codec transaction may correspond to a set of multiple block transactions including at least one write command for initiating the application processing of host data and at least one read command for returning the resulting processed host data.

In some embodiments, storage command 224 may be formatted based on the NVMe storage communication protocol with a command identifier 226, an operation code (opcode) 228, a namespace identifier 230, a buffer address 232, and one or more command parameters 234. Command identifier 226 may be a unique identifier assigned to each command for tracking processing and status through submission and completion queue pairs. Operation code 228 may be a code corresponding to the operation type of the command, such as read, write, delete, a vendor-specific operation type, etc. Namespace identifier 230 may be the unique identifier for the namespace that maps storage locations between host systems, such as host system 202, and one or more data storage devices, such as data storage device 260. Buffer address 232 indicates the memory location in host memory buffer 240 where host system 202 has stored input video data 212 for processing or storage in data storage device 260. In a read command, buffer address 232 may indicate the memory location in host memory buffer 240 that should receive the processed or read data from data storage device 260. Command parameters 234 may correspond to defined NVMe command values that govern how a storage command is processed by the storage system. In some embodiments, command parameters 234 may include an application indicator flag or other value to notify data storage device 260 that the storage command contains an application executable, rather than a normal storage command. Storage command 224 may be written to a storage command queue, such as submission queue 244.1.

Block transactions 222 may also determine the buffer location of host data 236 to be used by data storage device 260 to complete storage command 224 for write commands and write commands containing application executables. For normal write commands, host data 236 may be entirely comprised of the target data for storage, such as input video data 212 that is to be stored to non-volatile storage medium 266. For application tunneling commands, host data 236 may include a set of executable parameters 238 for transcoder 290 in memory locations that would normally include host data. For example, host data 236 may include a predetermined set of LBAs allocated to a command header for transcoder commands that may be parsed by transcoder 290 to determine configuration and metadata parameters for the received video data format, target video data format, and any scaling to be done in between decoding and re-encoding. In some embodiments, use of vendor-specific commands may enable some or all of the command parameters for the application processing to be included in command parameters 234 of storage command 224 and host data 236 may include only the video data.

Host memory buffer 240 may include host memory locations allocated for direct memory access by data storage device 260 and defining a set of NVMe registers for command queues and host data buffers used to manage storage operations between host system 202 and data storage device 260. In some embodiments, host memory buffer 240 (or another configuration data location in host system 202) may include an NVMe register map 242 including a data structure that maps at least a portion of the memory locations in the DRAM of host system 202 to NVMe registers serving specific functions for the storage communication protocol. Some or all of NVMe register map 242 may be shared with data storage device 260 (and may be stored in NVMe controller 268 as NVMe register map 270) to describe the shared memory locations for direct memory access by data storage device 260. In some embodiments, the NVMe registers of host memory buffer 240 may include a plurality of command queues, sometimes referred to as queue pairs. Each command queue may be comprised of a submission queue 244 and a completion queue 246 and a number of command queues may be defined in NVMe register map 242, such as submission queues 244.1-244.$n$ and completion queues 246.1-246.$n$. Storage commands, such as storage command 224, may be written to a submission queue, such as submission queue 244.1, by NVMe driver 250 and read from the submission queue by NVMe controller 268. The response to the storage command may be written to a corresponding completion queue, such as completion queue 246.1, by NVMe controller 268 to provide command status information and any response parameters. Host memory buffer 240 may also include one or more host data buffers 248.1-248.$n$ configured to temporarily store host data to be sent to or received from data storage device 260. For example, block transactions 222 may receive or write input video data 212 to a data buffer in host memory buffer 240 for access by data storage device 260 and the memory address for the host data may be included in the corresponding storage command or storage commands. Similarly, data storage device 260 (including transcoder 290) may write read and/or processed host data back to a data buffer in host memory buffer 240 to return that data for a read command or set of block transactions.

In addition to writing storage commands to command queues and managing pointers to host data buffers for communication between host system 202 and data storage device 260, NVMe driver 250 may be configured to send and receive notification messages to and from data storage device 260. For example, NVMe driver 250 may send notification message 252 to data storage device 260 to notify NVMe controller 268 that at least one new storage command has been added to one or more command queues. In some embodiments, notification message 252 may be referred to as ringing the doorbell and may include command identifier(s), memory pointer(s) for the storage commands, and/or buffer locations of the host data. Upon completion of each storage command and/or the final storage command in a set of storage commands corresponding to the block transactions for a codec transaction, NVMe controller 268 may return a completion message 254 to NVMe driver 250 to notify host system 202 of the completion of the storage command(s).

Data storage device 260 may be configured similarly to data storage devices 120 in FIG. 1 and may communicate with host system 202 through a storage bus and corresponding storage bus interface protocol, such as PCIe. Data storage device 260 may include at least one device processor and device memory to provide working compute resources for executing both general host interface and storage-specific functions. These processor and memory resources may be separate from the application-specific processor resources of transcoder 290. In some embodiments, memory 264 may include a storage buffer memory that may be shared by both normal storage operations to non-volatile storage medium 266 and application processing by transcoder 290. For example, host data from host memory buffer 240 may be moved into the shared storage buffer memory regardless of whether it is being used for a storage operation (e.g., write operation to non-volatile storage medium 266) or a data processing operation (e.g., transcoding operation by transcoder 290). Non-volatile storage medium 266 may include NVM devices, such as NVM devices 140 in FIG. 1, or another form of non-volatile memory, such as magnetic disk or tape, or a combination of non-volatile memory (hybrid drive). In some embodiments, data storage device 260 may be replaced by an application processing unit similar to processing unit 160 in FIG. 1. The application processing unit may be configured similarly to data storage device 260 except that it may not include non-volatile storage medium 266 and may not be configured to handle normal storage operations, only storage commands for application-specific processing tunneling to transcoder 290.

NVMe controller 268 may include host interface functions, direct memory access protocols, and command handling according to NVMe storage communication protocols. In addition to supporting standard storage IO and storage device administration commands, NVMe controller 268 may be configured to determine storage commands containing block transactions for transcoder 290. For example, storage command parameters 234, notification 252, and/or executable parameters 238 may include an application indicator value that notifies NVMe controller 268 that a received storage command includes one or more block transactions for transcoder 290 and should be handled differently than standard storage commands. For example, rather than passing a write or read command to a read/write channel for non-volatile storage medium 266, NVMe controller 268 may pass command parameters and the buffer location for host data 236 to transcoder 290. NVMe controller 268 may pass control, which may include priority for memory 264 and/or processor 262 in some embodiments, for completing the storage command to transcoder 290 and await a response from transcoder 290 to return control and complete the host interface portion of completing the storage command. In some embodiments, NVMe controller 268 may include the DMA engine used for reading target host data 296 from host memory buffer 240 and/or returning processed data 298 to host memory buffer 240. In some embodiments, transcoder 290 may include its own DMA engine. As mentioned above, NVMe controller 268 may include or access NVMe register map 270 for determining accessible memory locations and corresponding register functions in host memory buffer 240.

Transcoder 290 may be configured as an application-specific processing circuit for transcoding video data. For example, transcoder 290 may include one or more video encoders 292 and video decoders 294 based on specialized circuitry for accelerating video processing. In some embodiments, transcoder 290 may include a set of codec libraries and corresponding video processing parameter settings to receive video data encoded in a first video format, decode the video into a video data stream and re-encode the video data stream using a second video format. For example, transcoder 290 may be configured to receive a block of video data encoded in .flv format and transcode it to .mpg format using specialized decoder and encoder hardware. In some embodiments, transcoder 290 may further include video scaling logic configured to scale the video data stream prior to re-encoding. Transcoder 290 may receive command parameters from storage command 224 (through NVMe controller 268) and/or parse command parameters from executable parameters 238 in host data 236. Transcoder 290 may include processor logic for using the received command parameters to determine the parameter settings for encoder 292, decoder 294, and/or any scaling. Transcoder 290 may be configured to operate on target host data 296 received from host memory buffer 240 by DMA and return processed host data 298 to host memory buffer 240 by DMA. For example, a physical region page (PRP) may be received by transcoder 290 from host memory buffer 240, the PRP may contain a frame of encoded video data, which may be processed by transcoder 290 to decode and re-encode, and then the resulting frame in the target video format may be written by DMA back to the PRP in host memory buffer 240. Upon return of processed host data 298, transcoder 290 may notify NVMe controller 268 that one or more storage commands are complete and return operation to NVMe controller 268.

NVMe controller 268 may, in turn, send completion message 254 as an alert message via host interrupt. NVMe driver 250 may receive completion message 254 and parse completion data 272 from the corresponding completion queue, such as completion queue 246.1. In some embodiments, completion data 272 may include return parameters 274, a submission queue pointer 276, command status 278, and command identifier 280. For example, return parameters 274 may include output parameters from processing the command, submission queue pointer 276 may indicate the corresponding submission queue through which the storage command was received (e.g., storage command 224), command status 278 may include a command status value indicating successful completion of the command or one or more error states, and command identifier 280 may include the same unique command identifier that was assigned to the storage command. NVMe driver 250 may use completion data 272 to determine the memory buffer addresses containing returned data and pass them to block transactions 222 to determine the locations of the output video file with the changed formatting. Video transcoding application 210 may then output the transcoded video file as output video data 214 for storage, further processing, or serving on demand or as part of a live stream. In some embodiments, video transcoding application 210 (and corresponding host libraries) may be responsible for additional video processing tasks, such as demultiplexing the received video data before it is stored to host memory buffer 240 and multiplexing the processed video data before it is returned as output video data 214.

Figure 3:
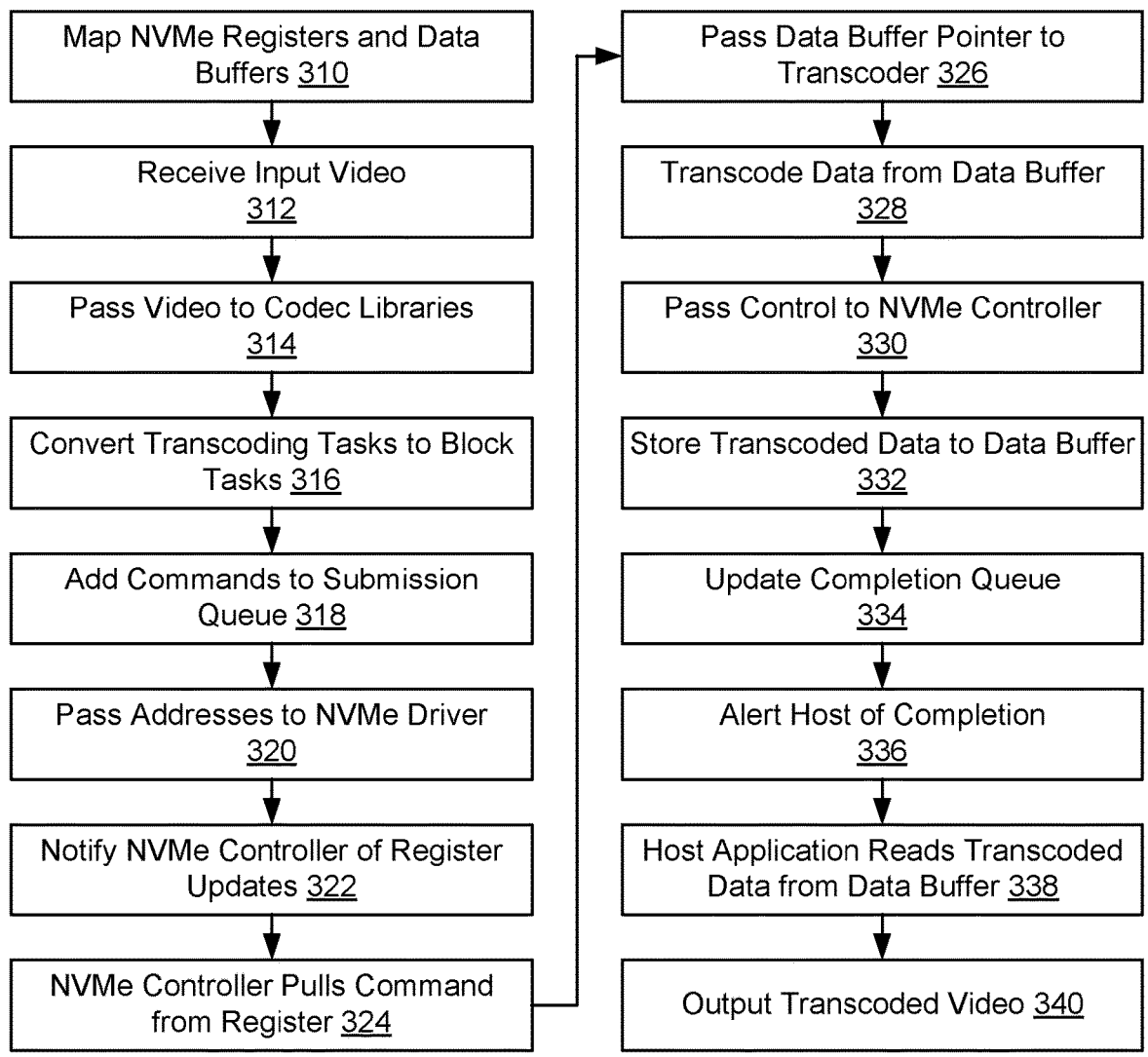
FIG. 3 schematically illustrates an example process flow for the application tunneling architecture of FIG. 2.

FIG. 3 shows an example process flow for the application tunneling architecture of FIG. 2. At block 310, NVMe registers and data buffers may be mapped. For example, both the host system and the data storage device may be configured with corresponding maps of the NVMe registers for the command queues and host data buffers in host DRAM that are shared by the two devices. At block 312, input video data may be received. For example, a video transcoding application may be initiated on the host system with a command that indicates a source video data file or stream to be transcoded. At block 314, the source video data may be passed to appropriate codec libraries for the source video format and target video format. For example, based on the command parameters of the video transcoding application, the video transcoding application may identify the source video format, target video format, and any related scaling or codec parameters and use those parameters to initiate corresponding codec transactions in the codec libraries. Foregoing blocks 312-314 may include standard application processing for handling transcoding transactions.

At block 316, transcoding tasks may be converted to block tasks. For example, a transcoding transaction determined at block 314 by the codec libraries may be passed to a task conversion API that converts the transcoding transaction into a set of NVMe block transactions, such as one or more write storage commands and one or more read storage commands. At block 318, storage commands are added to one or more submission queues in the NVMe command queues on the host data buffer. For example, the NVMe driver may receive the block tasks from block 316 as NVMe storage command calls, format them using NVMe storage communication protocols, and write them to appropriate submission queues. At block 320, buffer addresses for the source video data may be passed to the NVMe driver. For example, the block transactions at block 316 may determine a previously stored buffer location and/or store the video data to a buffer location in the host memory buffer and provide corresponding memory addresses to the NVMe driver for inclusion in the storage commands. Note that blocks 316, 318, and 320 may operate in any order appropriate to how the block tasks are determined and initiated by the task conversion API.

At block 322, the NVMe controller of the data storage device may be notified of register updates. For example, the NVMe driver may send a notification message to the NVMe controller indicating that new storage commands and corresponding host data are available for processing. At block 324, the NVMe controller may pull corresponding storage commands from the command queue registers. For example, based on the notification message, the NVMe controller may determine new storage commands in one or more submission queues and read them from the host memory buffer. At block 326, the data buffer pointer may be passed from the NVMe controller to the transcoder. For example, the NVMe controller may determine the data buffer pointer and one or more command parameters from the storage command and pass them, along with control for completing the storage command, to the transcoder circuit. At block 328, video data from the data buffer may be transcoded by the transcoder. For example, the transcoder may use direct memory access to receive the source video data (with or without additional command parameters) from the host memory buffer and execute one or more decoding and encoding functions to transcode the source video data into the requested video format.

At block 330, control may be returned to the NVMe controller. Once the video data is processed, control for completing the storage commands may be returned to the NVMe controller by the transcoder circuit. At block 332, the transcoded data may be returned to the host system by DMA writing to a host data buffer in the host memory buffer. For example, the transcoder (with or without the assistance of the NVMe controller) may use DMA to write the transcoded video data to the same host data buffer from which the source video data was read. At block 334, the NVMe controller may update the completion queue. For example, based on completion of the application processing by the transcoder, the NVMe controller may write completion data to the corresponding completion queue for the submission queue of the storage command. At block 336, the host may be alerted to the completion of the storage command. For example, the NVMe controller may send a completion message via interrupt to the host.

At block 338, the host application reads the transcoded data from the data buffer. For example, the NVMe driver may notify the video transcoding application of the completion of the block transactions and the conversion API may translate the set of completed block transactions into a completed codec transactions with the transcoded video data in the data buffer. At block 340, the transcoded video data may be output by the host application. For example, the transcoded video data from the data buffer may be reassembled and/or multiplexed into a video file or video data stream for storage or serving to end users.

Figure 4:
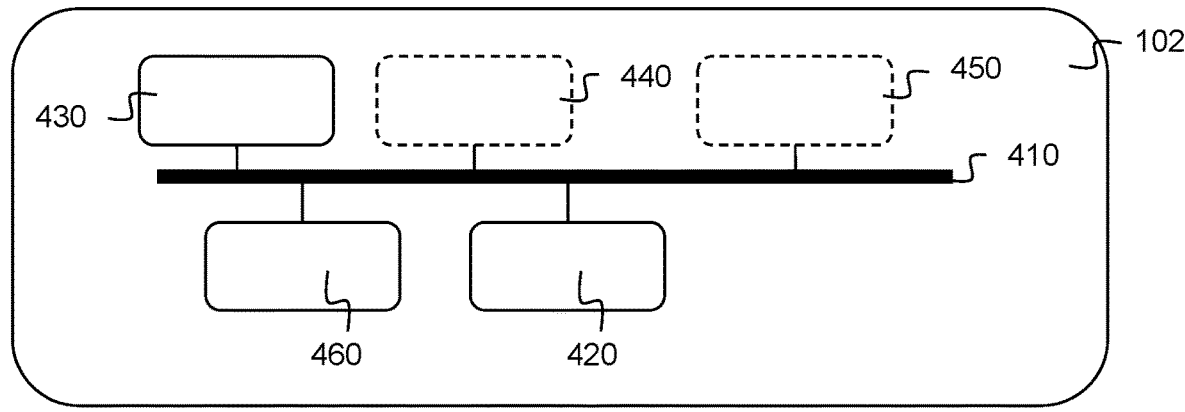
FIG. 4 schematically illustrates a host system or storage controller node of the multi-device storage system of FIG. 1.

FIG. 4 shows a schematic representation of an example storage controller 102, host system 150, or similar system node. Storage controller 102 may comprise a bus 410, a processor 420, a local memory 430, one or more optional input units 440, one or more optional output units 450, and a communication interface 460. Bus 410 may include one or more conductors that permit communication among the components of storage controller 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to storage controller 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables storage controller 102 to communicate with other devices and/or systems. In some embodiments, communication interface 460 may include one or more peripheral interfaces, such as a PCIe interface for connecting to storage devices 120 as a host storage interface.

Figure 5:
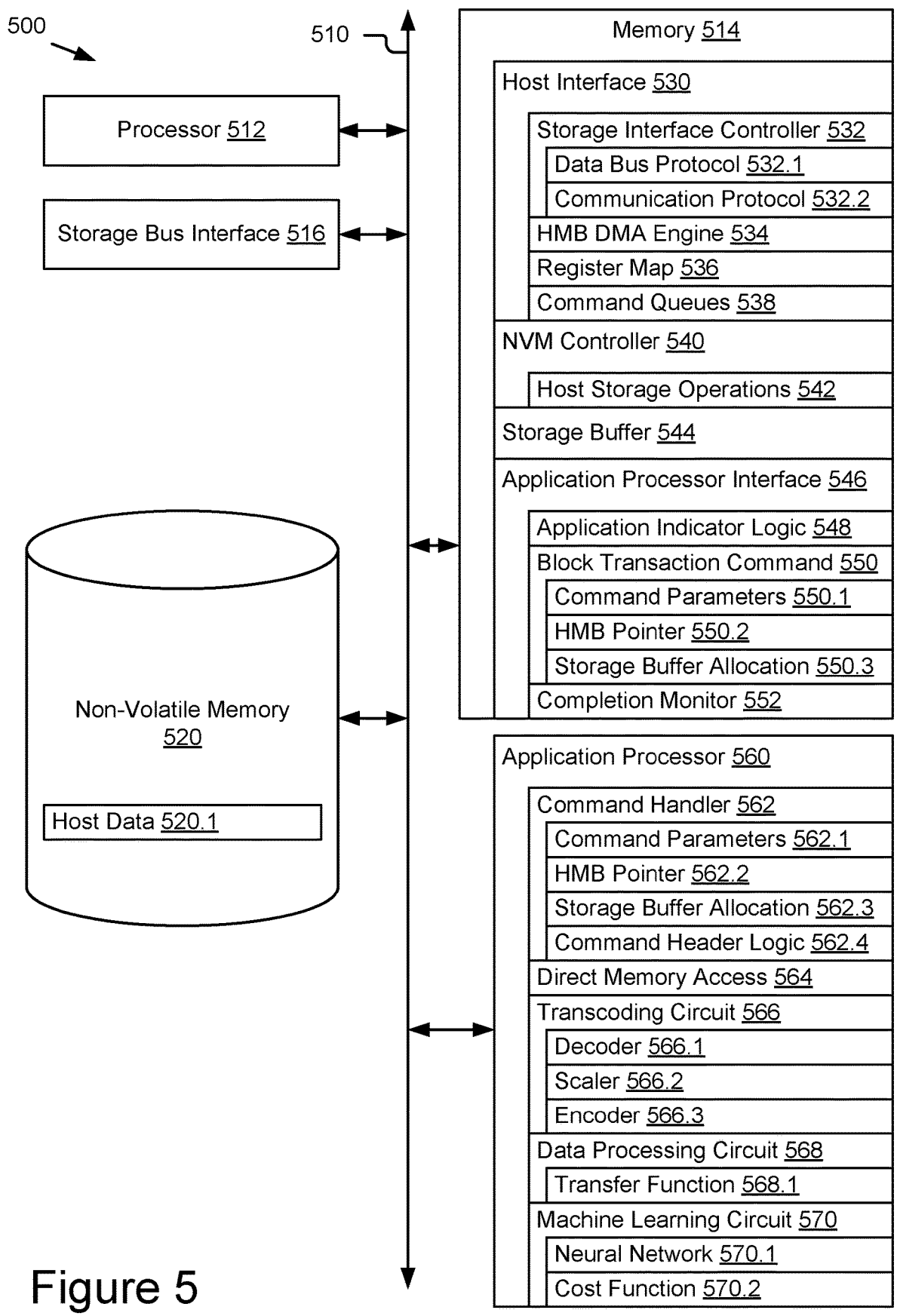
FIG. 5 schematically illustrates some elements of the data storage devices of FIG. 1-3 in more detail.

FIG. 5 schematically shows selected modules of a storage device 500 configured for application tunneling for data processing by application processor 560. Storage device 500 may incorporate elements and configurations similar to those shown in FIGS. 1-2. For example, storage device 500 may be configured as a storage device 120 or 260 including application processor circuits, such as processor circuit 110 or transcoder 290, that are accessed using NVMe storage communication protocols.

Storage device 500 may include a bus 510 interconnecting at least one processor 512, at least one memory 514, and at least one physical interface, such as storage bus interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element. In some embodiments, bus 510 may also connect to non-volatile memory 520 for accessing non-volatile memory locations to support storage operations. In some embodiments, bus 510 may also connect to an application processor 560 configured to execute application data processing based on application processing commands tunneled through storage commands.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520.

Storage device 500 may include one or more non-volatile memory devices 520 configured to store host data 520.1. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage device 500 may include application processor 560 in communication with host interface 530, such as through application processor interface 546, for receiving application commands through storage communication protocols, such as NVMe. In some embodiments, the other components of storage device 500 may share resources and communicate with application processor 560 using a shared bus 510. For example, each component may be attached to a common printed circuit board assembly (PCBA) and bus 510 may include circuits and interconnects within the PCBA. In some embodiments, application processor 560 may be configured as a separate package, such as an FPGA, ASIC, or system-on-a-chip (SOC) with an interface for connecting to bus 510. Application processor 560 may be configured as a processor circuit with processor, memory, and logic hardware for performing application-specific data processing, which may be supported by firmware or other software instructions. For example, application processor 560 may include a processor similar to processor 512 and/or a memory similar to 514 to support operation of one or more application-specific circuits, such as transcoding circuit 566, data processing circuit 568, or machine learning circuit 570. The modules or subsystems of application processor 560 are further described below.

Storage device 500 may include a plurality of modules or subsystems that are stored and/or instantiated in memory 514 for execution by processor 512 as instructions or operations. For example, memory 514 may include a host interface 530 configured to receive, process, and respond to host storage requests from client or host systems. Memory 514 may include a non-volatile memory (NVM) controller 540 configured to manage read and write operations to non-volatile memory devices 520. Memory 514 may include a storage buffer 544 for temporarily storing data being written to or read from non-volatile memory 520, read from and/or written to a host memory buffer of the host system, and/or processed by application processor 560. Memory 514 may include an application processor interface 546 configured manage communication with application processor 560 based on application-specific commands received in storage commands through host interface 530.

Host interface 530 may include interface protocols and/or a set of functions, data structures, and/or parameters for receiving, parsing, responding to, and otherwise managing host storage requests from a host. For example, host interface 530 may include functions for receiving and processing host storage commands for reading, writing, modifying, or otherwise manipulating data blocks and their respective client or host data and/or metadata in accordance with storage bus interface and storage communication protocols. In some embodiments, host interface 530 may enable direct memory access and/or access over NVMe protocols through storage bus interface 516 to the host memory buffers of one or more host systems. For example, host interface 530 may include host communication protocols compatible with PCIe, SATA, SAS, and/or another bus interface that supports use of NVMe protocols for data access to host memory buffers for accessing command queues and host data for transfer from or to the host.

In some embodiments, host interface 530 may include a plurality of hardware and/or software modules configured to use processor 512 and memory 514 to handle or manage defined operations of host interface 530. For example, host interface 530 may include a storage interface controller 532 configured to comply with the physical, transport, and storage communication protocols supported by the host for communication over storage bus interface 516. For example, storage interface controller 532 may include both PCIe and NVMe compliant communication, command, and syntax functions, procedures, and data structures. In some embodiments, storage interface controller 532 may support a data bus protocol 532.1 for establishing communication with the host directly and/or through a storage controller and network/fabric connection. For example, data bus protocol 532.1 may include a PCIe, FC, SCSI, or SAS protocol to support a corresponding physical storage bus interface 516. In some embodiments, storage interface controller 532 may include a storage communication protocol 532.2 for supporting storage commands from the operating system and storage driver of the host system. For example, storage communication protocol 532.2 may include an NVMe compliant storage communication protocol for receiving storage commands, such as write, read, delete, and other commands for storage operations.

Some storage communication protocols, such as NVMe, may support use of a host memory buffer in the host system, such as an allocated portion of host system DRAM, and use direct memory access to access and transfer data between storage device 500 and the host system. In some embodiments, host interface 530 may include a host memory buffer (HMB) DMA engine 534 configured for direct memory access to memory locations in the host system (and/or storage controller). For example, HMB DMA engine 534 may enable host interface 530 to use memory addresses of the host memory to directly access those memory locations for read or write operations. For example, HMB DMA engine 534 may include a remote direct memory access (RDMA) compliant memory access protocol operable over storage bus interface 516 using data bus protocol 532.1. Host interface 530 may include a register map 536 configured to store a representation of the host memory locations allocated for use by storage device 500. For example, register map 536 may include an NVMe register map defining the memory locations of command queues 538 and/or host data buffers configured for host data block transfers. Host interface 530 may include or access host command queues 538 configured for receiving and responding to host storage commands. For example, command queues 538 may include command queue pairs of submission queues and completion queues mapped to specific namespaces and hosts for receiving and responding to host storage commands. In some embodiments, command queues 538 are hosted in a host memory buffer as defined in register map 536 and accessed using HMB DMA engine 534. In some embodiments, host interface 530 may include additional modules (not shown) for storage command handling, buffer management, storage device management and reporting, and other host-side functions.

NVM controller 540 may include an interface protocol and/or set of functions and parameters for reading, writing, and deleting data units in non-volatile memory devices 520. For example, host interface 530 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 540 may include flash translation layer (FTL) management, data state machine, read/write buffer management (for storage buffer 544), read/write channels, NVM device interface protocols, NVM device configuration/management/maintenance, and other device-side functions.

Storage buffer 544 may be a set of volatile memory devices within data storage device 500 for temporarily storing (buffering) data between host interface 530 and both non-volatile memory 520 (for storage operations) and application processor 560 (for application-specific operations). Storage buffer 544 may include a plurality of memory locations corresponding to host data unit sizes and/or NVM page sizes and may be used for buffering host data units to match physical program/erase units (going to the media), data processing blocks (going to application processor 560), and/or buffering read and/or processed data units to match host data units and/or data transfer units back to host memory. In some embodiments, host interface 530 may use HMB DMA engine 534 to transfer host data for writing or processing from the host memory to storage buffer 544 and host data (including processed data) for return to the host from storage buffer 544. In some embodiments, both NVM controller 540 and application processor 560 may have access to data stored in storage buffer 544 to carry out their respective storage or data processing operations. In some embodiments, application processor 560 may include its own DMA engine for moving host data between the host memory buffer and storage buffer 544.

Application processor interface 546 may include interfaces, functions, data structures, and parameters for receiving storage commands that include tunneled application processing commands and passing the commands and processing control to application processor 560. In some embodiments, application processor interface 546 may communicate with or be integrated in host interface 530 for receiving selected storage commands including block transaction commands. In some embodiments, application processor interface 546 may include a plurality of hardware and/or software modules configured to use processor 512 and memory 514 to handle or manage defined operations of application processor interface 546.

For example, application processor interface 546 may include application indicator logic 548, block transaction command logic 550, and completion monitor 552. For example, application indicator logic 548 may be configured to determine that a storage command includes a tunneled application processing command, such as a block transaction command for application processor 560. In some embodiments, application indicator logic 548 may be check an application indicator value in a storage command parameter received by host interface 530 in a storage command, where the application indicator value flags storage commands that include a tunneled block transaction command. In some embodiments, application indicator logic 548 may operate based on a vendor-specific command that indicates the block transaction command. In some embodiments, application indicator logic 548 may operate based on a header or configuration value in the host data received in storage buffer 544 as part of a storage operation. In any of these cases, application indicator logic 548 may determine further processing by application processor interface 546 to pass the block transaction command from the storage command to application processor 560.

Application processor interface 546 may be configured to parse a block transaction command 550 from the storage command and/or host data received for a host storage command. For example, block transaction command logic 550 may be configured for extracting command parameters 550.1 from the storage command and receiving a host memory buffer pointer 550.2 indicating where the corresponding host data is stored in the host memory buffer. In some embodiments, block transaction command logic 550 may include a storage buffer allocation 550.3 indicating a portion of storage buffer 544 allocated for use by application processor 560 for processing a block transaction command. For example, application processor 560 may be configured to operate on host data after it has been read from the host memory buffer location by host interface 530 and stored in storage buffer 544 or application processor 560 may be allocated additional memory in storage buffer 544 to support intermediate data in multi-step processing and/or output data that is in addition to or exceeds the memory size of the input data for the block transaction. Once the host data location and any command parameters for one or more block transaction commands are determined by block transaction command logic 550, block transaction commands may be passed to application processor 560, along with control and priority to process those block transaction commands. Application processor interface 546 may include completion monitor 552 configured to wait for indication from application processor 560 that block transaction command processing is complete and operation can be passed back to application processor interface 546 and/or host interface 530 for completing the pending storage command (or commands) in command queues 538. For example, application processor 560 may raise an alert message to application processor interface 546 in response to completing one or more block transaction commands.

Application processor 560 may include a processor circuit comprised of interfaces, functions, memory structures, and parameters for executing application-specific data processing based on the block transaction commands determined by application processor interface 546. As described above, application processor 560 may be configured as a separate processor circuit with specialized hardware logic that is separate from the general processor circuit of processor 512. Similarly, application processor 560 may have dedicated operating memory for data processing operations that is separate from memory 514, though it may share access to storage buffer 544. In some embodiments, application processor 560 may operate independently of the other components after a block transaction command is received and operation processing is passed to application processor 560. In some embodiments, application processor 560 may be configured to access and use capabilities of other components during block transaction processing, such as processor 512, memory 514, HMB DMA engine 534, storage buffer 544, and/or NVM controller 540 (including parity calculators, error correction engines, and other specialized hardware). In some embodiments, application processor 560 may include at least one general purpose processor and operating memory for executing software instructions to carry out one or more functions. In some embodiments, application processor 560 may include a plurality of hardware and/or software modules configured to use processor and memory resources to handle or manage defined operations of application processor 560. For example, application processor 560 may include a command handler 562 and direct memory access 564. Application processor 560 may also include application-specific logic circuits comprising specialized hardware and/or software for a designated type of application and corresponding block transaction command. Example application-specific logic circuits may include a transcoding circuit 566, a data processing circuit 568, and a machine learning circuit 570. In some embodiments, application processor 560 may include only one type of application-specific logic circuit.

Command handler 562 may include an interface and logic for receiving or determining block transaction command parameters and input data for an application processing operation. For example, command handler 562 may receive a block transaction command from application processor interface 546 that includes command parameters 562.1 for the block transaction and a host memory buffer pointer 562.2 indicating the memory location of the input data. Application executable parameters may include command parameters that are input to the application-specific logic circuits to control their functions. For example, parameters describing the source video format, any scaling, and the target video format may be application executable parameters for transcoding circuit 566. Application executable parameters may be received as command parameters 562.1 and/or parsed from the host data indicated by HMB pointer 562.2. In some embodiments, command handler 562 may receive a storage buffer allocation 562.3, such as identifiers for a set of memory locations in storage buffer 544, that may be used by application processor 560 to execute the received block transaction. For example, application processor interface 546 may use DMA to store the input data in storage buffer 544 and indicate the memory locations of the input data in the block transaction command sent to command handler 562. In some embodiments, command handler 562 may include command header logic 562.4 configured to extract command parameters for the block transaction from the host data received from the HMB. For example, a portion of the host data block, such as a predetermined range of LBAs in the host data, may be allocated to a command header that includes command parameters, such as configuration data, metadata parameters, and/or other application executable parameters, and command header logic 562.4 may read that portion of the host data block to determine at least a portion of the command parameters for the block transaction. The application executable parameters and the memory location of the input host data to be operated on may be passed by command handler 562 to the application-specific logic circuit for the application type.

In some embodiments, application processor 560 may include direct memory access 564 for accessing host data from the host memory buffer and/or storage buffer 544. For example, application processor interface 546 may pass HMB pointer 550.2 without host interface 530 transferring the host data from the host memory buffer to storage buffer 544 and application processor 560 may use its own DMA engine to access the host data directly from the host system. In another example, application processor 560 may use a DMA protocol to access host data that has been stored to storage buffer 544 based on one or more memory locations or pointer in storage buffer allocation 562.3. In some embodiments, direct memory access 564 may also be used to store the output data from application processor 560. For example, after processing the input data, the processed data may be written by DMA to the host memory buffer directly or to storage buffer 544 for host interface 530 to transfer by DMA to the host memory buffer.

Transcoding circuit 566 may include at least one integrated circuit component, such as an FPGA, ASIC, or SOC, configured to perform block transactions to transcode video data from a source format to a target format. In some embodiments, transcoding circuit 566 may include a decoder circuit 566.1, a scaler circuit 566.2, and an encoder circuit 566.3. For example, decoder circuit 566.1 may be configured to decode video data based on the codec with which it was encoded. Scaler circuit 566.2 may be configured to receive the decoded video data stream from decoder circuit 566.1 and apply one or more scaling factors to change aspect ratio, pixel count, sample rate, or other video stream characteristics. Encoder circuit 566.3 may be configured to encode the video data stream (directly from decoder circuit 566.1 or after scaling by scaler circuit 566.2) to a target codec and set of encoding parameters for that codec. In some embodiments, a block transaction command may include application executable parameters including source codec parameters defining the settings to be used by decoder circuit 566.1, scaler parameters (if any) defining the settings to be used by scaler circuit 566.2, and target codec parameters defining the settings to be used by encoder circuit 566.3 for the target video format. A first block transaction command may be received from a write storage command to initiate the transcoding and provide the input video data and a second block transaction command may be received from a read storage command to initiate output of the transcoded video data in the target video format back to the host system.

Data processing circuit 566 may include at least one integrated circuit component, such as an FPGA, ASIC, or SOC, configured to perform a block transaction to transform host data from a source collection of data elements to a target collection of data elements. For example, data processing circuit 566 may be configured to extract or filter structured or unstructured data, reformat data for different file types, or perform search, translation, metadata analysis, or other data processing functions unrelated to storage of the host data to a non-volatile storage medium. In some embodiments, data processing circuit 568 may embody one or more transfer functions 566.1 for processing source data into the target output data. For example, a series of transfer functions may be embodied in hardware and/or software circuits for filtering data elements from the source data to provide a filtered data set as output. A first block transaction command may be received from a write storage command to initiate the data processing and provide the input data and a second block transaction command may be received from a read storage command to initiate output of the transformed data back to the host system.

Machine learning circuit 570 may include at least one integrated circuit component, such as an FPGA, ASIC, or SOC, configured to perform a block transaction to train weighting values for an artificial neural network circuit from a series of source data elements. For example, machine learning circuit may be configured to receive training data and desired output values and process them through a machine learning algorithm to generate and/or update the node coefficients for a neural network. In some embodiments, machine learning circuit 570 may include a neural network circuit 570.1 conforming to a desired neural network topology (nodes, layers, and functions) and a cost function 570.2 for training the node coefficients. For example, neural network circuit 570.1 may be designed for a specific application function, such as image recognition, voice recognition, pattern recognition, etc., and cost function 570.2 may determine how the node coefficients are adjusted based on differences between the training output and ideal output for each training iteration on the training data. A first block transaction command may be received from a write storage command to initiate neural network training and provide at least a first portion of the training data and a final block transaction command may be received from a read storage command to initiate output of the determined set of node coefficients from a series of training data blocks. In some embodiments, after machine learning circuit 570 has been trained, it may be used for runtime processing of input data to generate the desired output data and the output data may be image, voice, or pattern identification based on the input data and the trained neural network circuit and node coefficients.

Figure 6:
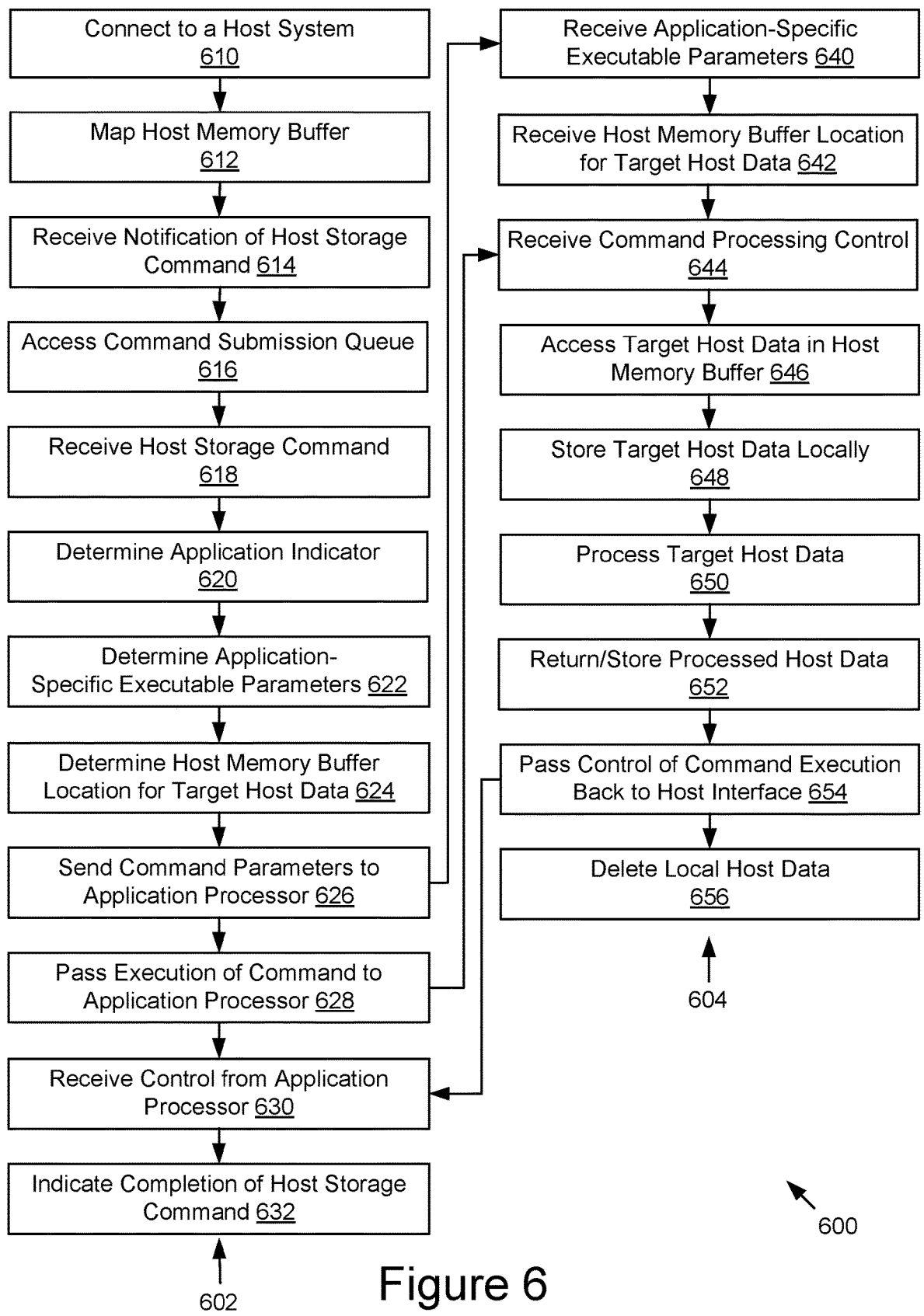
FIG. 6 is a flowchart of an example method of application data processing using tunneling through a storage interface protocol.

As shown in FIG. 6, storage device 500 may be operated according to an example method for application data processing using tunneling through a storage interface protocol, i.e., according to method 600 illustrated by blocks 610-656 in FIG. 6. In some embodiments, blocks 610-632 indicated at 602 may be executed by the host interface of a data storage device and blocks 640-656 indicated at 604 may be executed by an application processor of the data storage device.

At block 610, a storage device may be connected to a host system. For example, a storage device may be mapped to a host system using a storage interface protocol and storage communication protocol through a storage interface bus and/or network fabric.

At block 612, a host memory buffer may be mapped. For example, the storage device may receive a register map for a host memory buffer of the host system to support storage operations.

At block 614, notification of a host storage command may be received. For example, the host system may send a new command alert message to the storage device when a new storage command is available for processing.

At block 616, a command submission queue may be accessed. For example, the storage device may use direct memory access to read the storage command from a submission queue in the host memory buffer.

At block 618, the host storage command may be received. For example, the storage device may read the storage command and parse the command parameters and other arguments of the storage command.

At block 620, an application indicator may be determined. For example, the storage device may determine from the command parameters that an application indicator flag is set to a value indicating that a block transaction for the application processor is contained in the storage command and corresponding host data.

At block 622, application-specific executable parameters may be determined. For example, the command parameters and/or the corresponding host data may include parameters for use by the application processor circuit to determine the settings used for processing the host data.

At block 624, a host memory buffer location may be determined for the target host data. For example, the storage command may include a host buffer location that is read by the storage device.

At block 626, command parameters may be sent to the application processor. For example, the storage device may send command parameters corresponding to a block transaction command to the application processor circuit.

At block 628, execution of the command may be passed to the application processor. For example, the storage device may initiate processing of the block transaction command by the application processor and then wait for a response.

At block 630, control may be received back from the application processor. For example, the storage device may receive a completion notification from the application processor when execution of the block transaction command is complete.

At block 632, completion of the host storage command may be indicated. For example, in response to the application processor completing the processing of the block transaction command, the storage device may update the completion queue for the storage command with an operation complete status and raise an interrupt to the host system indicating the change in status.

At block 640, application-specific executable parameters may be received by the application processor. For example, the application processor circuit may receive the executable parameters for a block transaction command in the command parameters sent at block 626.

At block 642, a host memory buffer location for the target host data may be received. For example, the application processor circuit may receive a pointer or other memory address in the command parameters for the host buffer storing the target host data for processing.

At block 644, command processing control may be received. For example, the application processor circuit may receive control from the storage device at block 628 to allow the application processor to complete processing of the block transaction command.

At block 646, target host data may be accessed in the host memory buffer. For example, the application processor circuit may access the target host data by direct memory access to the host memory buffer.

At block 648, target host data may be stored locally for processing. For example, the target host data may be read from the host buffer into a local storage or processing buffer.

At block 650, the target host data may be processed. For example, the application processing circuit may process the target host data based on the executable parameters received at block 640.

At block 652, processed host data may be returned or stored. For example, the application processor circuit may return the processed host data by storing it to the host memory buffer.

At block 654, control of command execution may be returned to the host interface of the storage device. For example, the application processor circuit may indicate completion of the processing of the block transaction command and the completion notification may be received at block 630.

At block 656, local host data may be deleted. For example, in some configurations, the storage device may not retain a copy of the target host data or the processed host data following its return of the processed host data to the host memory buffer—acting only as an application processor and not a non-volatile storage device for the storage command that included the tunneled block transaction command.

Figure 7:
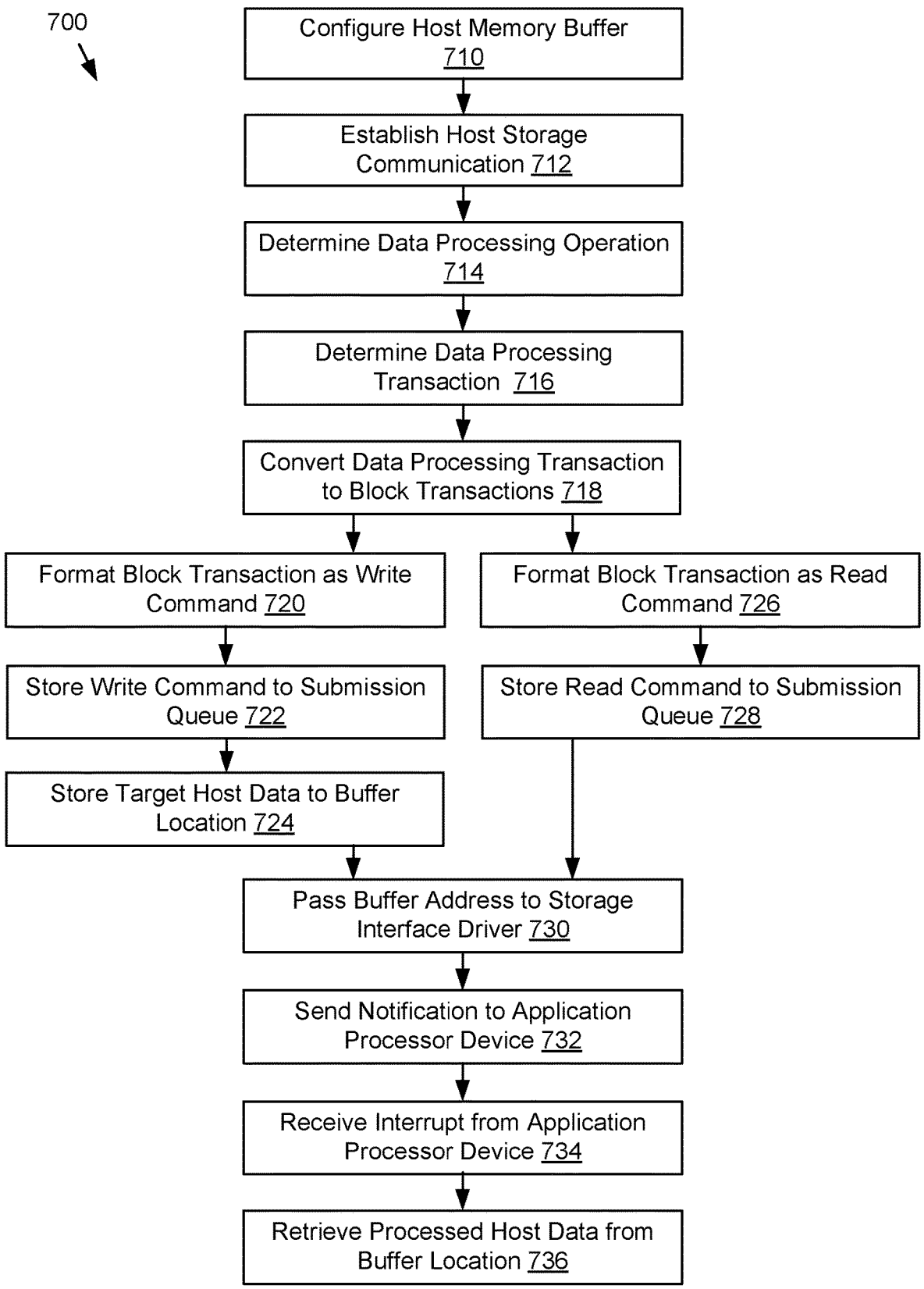
FIG. 7 is a flowchart of an example method of offloading host application data processing using tunneling through a storage interface protocol.

As shown in FIG. 7, host system 150 and/or 202 may be operated according to an example method for offloading host application data processing using tunneling through a storage interface protocol, i.e., according to method 700 illustrated by blocks 710-736 in FIG. 7.

At block 710, a host memory buffer may be configured. For example, a storage communication protocol may define a host memory buffer in host system DRAM with registers allocated for command queues and buffers for host data transfer.

At block 712, host storage communication may be established. For example, the host system may be mapped to at least one storage device or processing unit that includes an application processor circuit using the storage communication protocol and acting as an application processor device.

At block 714, data processing operation may be determined. For example, the host system may receive or determine an application request that requires one or more data processing operations to complete.

At block 716, a data processing transaction may be determined. For example, host libraries supporting the host application may determine a data processing transaction to be executed.

At block 718, the data processing transaction may be converted to a plurality of block transactions. For example, a task conversion API may break the data processing transaction into a number of block transactions supporting a data block size and based on separate write block transactions to send the host data via storage command and read block transaction to receive data processing results.

At block 720, a block transaction may be formatted as a write command. For example, the task conversion API may format data input block transactions as write storage commands complying with the storage communication protocol.

At block 722, the write command may be stored to a submission queue. For example, the task conversion API may pass a system call to the storage interface driver to write the write command including the block transaction executable parameters to a command queue in the host memory buffer.

At block 724, target host data may be stored to a buffer location. For example, the host system may store the target host data for the data processing transaction in a data buffer in the host memory buffer and may allocate block-sized portions to different buffer locations.

At block 726, a block transaction may be formatted as a read command. For example, the task conversion API may format data output block transactions as read storage commands complying with the storage communication protocol.

At block 728, the read command may be stored to a submission queue. For example, the task conversion API may pass a system call to the storage interface driver to write the read command including the buffer location for returning the processed data to a command queue in the host memory buffer.

At block 730, the buffer address may be passed to the storage interface driver. For example, both write commands and read commands may be supported by buffer locations in the host memory buffer for transferring data blocks to or from the application processor device and the storage interface driver may receive the buffer addresses for use in the storage commands and communication with the application processor device.

At block 732, notification may be sent to the application processor device. For example, the storage interface driver may send a new command notification to the storage device or processing unit that includes the application processor. Responsive to receiving the notification, the application processor device may retrieve the storage command and host data from the host memory buffer and initiate the block transaction processing.

At block 734, an interrupt may be received from the application processor device. For example, the storage interface driver may receive an interrupt when one or more storage commands are completed by the application processor device.

At block 736, processed host data or output data may be retrieved from the buffer location. For example, responsive to the buffer interface driver receiving notification of the read commands, the host application or task conversion API may retrieve (and, if necessary, reassemble) the output data from the block transactions to provide the data processing transaction output data.

Figure 8:
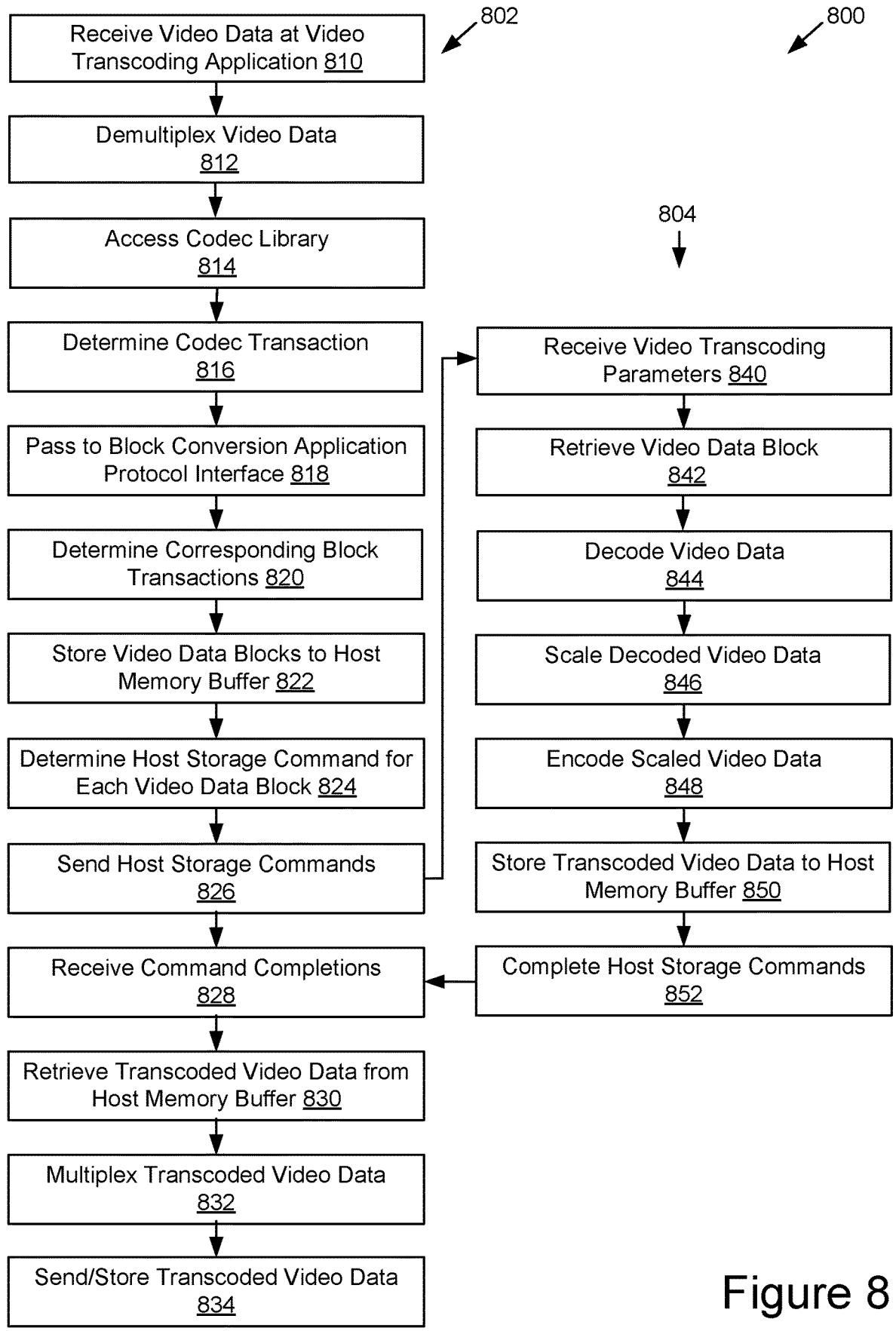
FIG. 8 is a flowchart of an example method of video transcoding using application processing tunneling through a storage interface protocol.

As shown in FIG. 8, host system 150 and/or 202 and transcoder 290 and/or application processor 560 may be operated according to an example method for video transcoding using application processing tunneling through a storage interface protocol, i.e., according to method 800 illustrated by blocks 810-852 in FIG. 8. For example, blocks 810-834 indicated by 802 may be executed by a host system and blocks 840-852 may be executed by a transcoder or application processor including a transcoding circuit. In some embodiments, a host interface complying with the storage interface protocol may operate between the host system and the transcoder or transcoding circuit substantially as described above for method 600 in FIG. 6 and elsewhere in the specification.

At block 810, video data may be received by a video transcoding application. For example, the host system may include a video transcoding application that receives video files in one format for transcoding into another format.

At block 812, the video data may be demultiplexed. For example, the video transcoding application may demultiplex a multiplexed video data stream.

At block 814, a codec library may be accessed. For example, the video transcoding application may rely on a host library that supports various codecs as source or target video data formats.

At block 816, a codec transaction may be determined. For example, the video transcoding application may determine a transaction for converting the source format of the video file to a target format.

At block 818, the codec transaction may be passed to a block conversion API. For example, the host libraries may include or interface with a block conversion API that converts application transactions to a plurality of block transactions.

At block 820, corresponding block transactions may be determined. For example, the block conversion API may divide the codec transaction into a plurality of block transactions that map to write storage requests and read storage requests.

At block 822, video data block may be stored to a host memory buffer. For example, each video data block corresponding to one of the write storage requests may be stored in a data buffer of the host memory buffer by the host system.

At block 824, at least one host storage command may be determined for each video data block. For example, the block conversion API may send storage calls with video transcoding parameters to a storage driver that generates write storage commands and read storage commands corresponding to the input and output sides of the block transactions.

At block 826, host storage commands may be sent. For example, the storage driver may store the write and read storage commands to command queues in the host memory buffer and notify the transcoder via a host interface that supports the storage interface protocol.

At block 828, command completions may be received. For example, after the block transactions are executed by the transcoder, the storage driver may receive command completion notifications indicating that the transcoded video data has been output by the transcoder.

At block 830, transcoded video data may be retrieved from the host memory buffer. For example, the video transcoding application and/or the block conversion API may read the transcoded video blocks from the host memory buffer to assemble the transcoded video file.

At block 832, the transcoded video data may be multiplexed. For example, the video transcoding application may multiplex the transcoded video data for streaming to an end user.

At block 834, transcoded video data may be sent or stored. For example, the host system may store the transcoded video data and/or send it to a video server for streaming live or on demand.

At block 840, video transcoding parameters may be received. For example, the transcoder may receive video transcoding parameters in the command parameters of write storage commands.

At block 842, a video data block corresponding to a write storage command may be retrieved. For example, the storage command may indicate a data buffer storing the source video data block and the transcoder (or a corresponding host interface) may retrieve the video data block from the data buffer.

At block 844, the video data may be decoded. For example, the transcoder may use video transcoding parameters for the source video format to configure a decoder to decode the source video data to an unencoded video data stream.

At block 846, the video data may be scaled. For example, the transcoder may use video transcoding parameters for scaling the unencoded video data stream to the image scale of the target video format.

At block 848, the video data may be encoded. For example, the transcoder may use video transcoding parameters for the target video format to configure an encoder to encode the unencoded video data stream (scaled or not) into transcoded video data.

At block 850, the transcoded video data may be stored to the host memory buffer. For example, responsive to a read storage command, the transcoder may store the transcoded video data to a data buffer specified in the read storage command.

At block 852, the host storage commands may be complete. For example, the transcoder (or a corresponding host interface) may notify the host system that the storage commands are complete and the transcoded video data is in the host memory buffer for further processing by the video transcoder application.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   a processor;
   a memory;
   a host interface configured to:
      connect, using a storage interface protocol, to at least one host system;
      receive, using the storage interface protocol, a host storage command; and
      determine, based on the host storage command:
         application-specific executable parameters; and
         target host data; and
   an application processor circuit configured to:
      receive, from the host interface, the application-specific executable parameters;
      receive, from the host interface, a buffer location for the target host data in a host memory buffer in the at least one host system;
      access, using direct memory access, the target host data in the host memory buffer;
      process, using the application-specific executable parameters, the target host data to generate processed host data; and
      return, to the at least one host system, the processed host data.

2. The system of claim 1, further comprising:
   a data storage device comprising:
      a non-volatile storage medium configured to store host data;
      the processor;
      the memory;
      the host interface; and
      the application processor circuit.

3. The system of claim 2, wherein the application processor circuit is further configured to store, prior to returning the processed host data, the processed host data in at least one of:
   the memory; or
   the non-volatile storage medium.

4. The system of claim 2, wherein:
   the host storage command is formatted as a write command comprising:
      a set of command parameters including the application-specific executable parameters;
      an application indicator configured to initiate passing execution of the host storage command to the application processor circuit; and
      a buffer address for the target host data;
   the host interface is further configured to indicate completion of the host storage command to the at least one host system; and
   the data storage device is configured to not retain the target host data in the non-volatile storage medium after completion of the host storage command.

5. The system of claim 1, wherein the host interface is further configured to:
   receive a notification of the host storage command;
   access, using direct memory access, the host storage command from a storage command queue in the host memory buffer in the at least one host system; and
   determine, from the host storage command, the buffer location in the host memory buffer for accessing the target host data.

6. The system of claim 1, wherein the host interface is further configured to determine, based on the host storage command, the buffer location for the target host data.

7. The system of claim 1, wherein the application processor circuit is further configured to store, using direct memory access, the processed host data to the buffer location in the host memory buffer on the at least one host system to return the processed host data.

8. The system of claim 1, further comprising:
the at least one host system configured to:
determine a data processing operation for an application, wherein the data processing operation is configured with a transaction format;
convert the data processing operation to a plurality of block transactions, wherein the host storage command corresponds to a selected block transaction of the plurality of block transactions; and
send the host storage command to the host interface for processing.

9. The system of claim 8, wherein:
the application is configured as a video transcoding application;
the data processing operation is configured as a codec transaction; and
the application processor circuit is further configured to:
decode the target host data;
scale the decoded host data; and
encode the scaled host data to generate the processed host data.

10. The system of claim 9, wherein the application processor circuit is configured as a field programmable gate array transcoder circuit.

11. A computer-implemented method, comprising:
connecting, using a storage interface protocol, to at least one host system;
receiving, using the storage interface protocol, a notification of a host storage command;
accessing, using direct memory access, the host storage command from a storage command queue in a host memory buffer in the at least one host system;
determining, based on the host storage command:
application-specific executable parameters;
target host data; and
a buffer location in the host memory buffer;
receiving, by an application processor circuit, the application-specific executable parameters;
accessing, using direct memory access, the buffer location in the host memory buffer for accessing the target host data;
processing, by the application processor circuit and using the application-specific executable parameters, the target host data to generate processed host data; and
returning, by the application processor circuit and to the at least one host system, the processed host data.

12. The computer-implemented method of claim 11, wherein a data storage device is configured to execute:
connecting to the at least one host system;
receiving the host storage command; and
determining the application-specific executable parameters and the target host data.

13. The computer-implemented method of claim 12, further comprising:
storing, by the application processor circuit and prior to returning the processed host data, the processed host data in at least one of:
a memory of the data storage device; or
a non-volatile storage medium of the data storage device.

14. The computer-implemented method of claim 12, further comprising:
indicating, by the data storage device, completion of the host storage command to the at least one host system, wherein:
the host storage command is formatted as a write command comprising:
a set of command parameters including the application-specific executable parameters;
an application indicator configured to initiate passing execution of the host storage command to the application processor circuit; and
a buffer address for the target host data; and
the data storage device is configured to not retain the target host data in a non-volatile storage medium of the data storage device after completion of the host storage command.

15. The computer-implemented method of claim 12, wherein the data storage device is configured to not retain the target host data in a non-volatile storage medium of the data storage device after completion of the host storage command.

16. The computer-implemented method of claim 11, further comprising:
receiving, by the application processor circuit, the buffer location for the target host data in the host memory buffer in the at least one host system; and
accessing, by the application processor circuit and using direct memory access, the target host data in the host memory buffer for processing the target host data.

17. The computer-implemented method of claim 11, further comprising:
storing, by the application processor circuit and using direct memory access, the processed host data to the buffer location in the host memory buffer on the at least one host system to return the processed host data.

18. The computer-implemented method of claim 11, further comprising:
determining, by the at least one host system, a data processing operation for an application, wherein the data processing operation is configured with a transaction format;
converting, by the at least one host system, the data processing operation to a plurality of block transactions, wherein the host storage command corresponds to a selected block transaction of the plurality of block transactions; and
sending, by the at least one host system, the host storage command for processing by the application processor circuit.

19. The computer-implemented method of claim 18, further comprising:
decoding, by the application processor circuit, the target host data;
scaling, by the application processor circuit, the decoded host data; and
encoding, by the application processor circuit, the scaled host data to generate the processed host data, wherein:
the application is configured as a video transcoding application; and
the data processing operation is configured as a codec transaction.

20. A data storage device, comprising:
a processor;
a memory;
a non-volatile storage medium;
means for connecting, using a storage interface protocol, to at least one host system;
means for receiving, using the storage interface protocol, a host storage command;
means for determining, based on the host storage command:
  application-specific executable parameters; and
  target host data; and
an application processor circuit comprising:
  means for receiving, by the application processor circuit, the application-specific executable parameters;
  means for processing, by the application processor circuit and using the application-specific executable parameters, the target host data; and
  means for returning, by the application processor circuit and to the at least one host system, processed host data.

* * * * *